Dec. 1, 1964 W. S. THOMAS, JR., ETAL 3,159,040

LINEAR STEPPING AND POSITIONING MECHANISM

Filed July 18, 1962 2 Sheets-Sheet 1

INVENTORS
DONALD L. KIRKPATRICK
WALTER S. THOMAS JR.

BY David Leedham [signature]

ATTORNEY

Dec. 1, 1964 W. S. THOMAS, JR., ETAL 3,159,040

LINEAR STEPPING AND POSITIONING MECHANISM

Filed July 18, 1962 2 Sheets-Sheet 2

United States Patent Office 3,159,040

Patented Dec. 1, 1964

3,159,040
LINEAR STEPPING AND POSITIONING MECHANISM

Walter S. Thomas, Jr., and Donald L. Kirkpatrick, Drexel Hill, Pa., assignors to Sperry Rand Corporation, New York, N.Y., a corporation of Delaware Filed July 18, 1962, Ser. No. 210,714
12 Claims. (Cl. 74—37)

This invention relates to the reading and recording of data upon the surface of the magnetic record and more particularly to a device for positioning the reading and recording heads with respect to a magnetic drum.

With the advent of high speed computing devices, it became necessary to furnish a storage device which is capable of storing sufficient data with a low access time, in other words, a large amount of information which might be available in a relatively short time. Some of the early devices used to satisfy this requirement were the relatively low speed electromechanical relay and the gas and vacuum tube matrix, and finally the high speed Williams-type cathode ray storage tube. Although these devices satisfy these requirements to some degree in each case, they are all subject to one difficulty. This difficulty was a loss of the information stored within the storage device upon the interruption of power to the storage device. Thus, information stored on the face of a cathode ray tube if not regenerated within the required period was lost. To overcome these difficulties, resort was made to magnetic devices such as the magnetic core or the magnetic drum. The prime difficulty with the use of magnetic cores is that it requires rather large matrices of cores to provide adequate storage. The magnetic drum offered the best compromise of ability to store a large amount of data, a reasonable access time, and immunity from loss due to failure of power. The drum could be made as large as desired in diameter and length to accomodate any amount of data which was required to be stored, providing the requisite mechanical problems of drive speed and balance were solved.

The usual manner of storing data upon this drum was to place it in a plurality of tracks or channels each of which ran around the circumference of the drum perpendicular to its length. In this manner, a great number of channels or tracks could be recorded along the length of the drum. To record data into or read data from any one of these tracks would require a magnetic head aligned with the particular track or channel. To solve the problems of alignment with the respect to track or channels, the heads were usually placed in a fix location. For example, one head for each one of the respective channels, i.e. should there be a hundred channels along the length of the drum there would be a requirement for 100 read and record heads. The selection of a particular one of these read or record heads required the operation of a rather complex tube matrix whereby a single one of the heads might be selected for reading or recording purposes. This selection matrix was generally in addition to the matrix required to determine that portion of the arc of a particular track which was required to store or read a particular word which was generally of a length shorter than the entire circumference of a track.

The use of a single magnetic recording and reading head which could travel along a path parallel with the length of the drum would permit a great reduction in a number of heads required, for example one head would be required to serve the 100 tracks whereas in the fixed head arrangement 100 heads would be required. In addition, it would not longer be necessary to employ the complicated matrix that was formerly necessary to select a particular one of the 100 reading and recording heads.

One problem with such a single head unit would be that of accurately placing the head in conjunction with a desired track to assure that that desired track was read out of or recorded into rather than some other non-desired track position. It is therefore an object of this invention to provide a head positioning device which overcomes these difficulties.

It is another object of this invention to provide a mechanically movable head assembly which can be accurately positioned in conjunction with a desired track or channel.

It is another object of this invention to provide a device which can be mechanically positioned so as to permit a later duplication of the same positioning of the head assembly easily.

In practicing the invention, there is provided a moving oscillating drive band or shuttle which in alternate cycles moves in a forward and reverse direction. The carriage containing the heads for recording or reading is placed between two guiding rods for movement along the length of the magnetic drum. This carriage assembly also contains a gripping means which upon proper actuation can be made to grip the oscillating drive band or shuttle. By proper actuation of the gripping means, it is possible to move the carriage assembly in a forward or backward direction depending upon the direction of shuttle travel at the time the gripping means is actuated. A detent roller and rack are provided with this carriage assembly to assure that the carriage is stopped at a precisely designated point.

Other objects and features of the invention will be pointed out in the following description and claims and illustrated in the accompanying drawings, which disclose, by way of example, the principle of the invention and the best mode which has been contemplated for carrying it out.

In the drawings.

Similar parts have been given similar reference numbers in all of the drawings.

Figure 1:
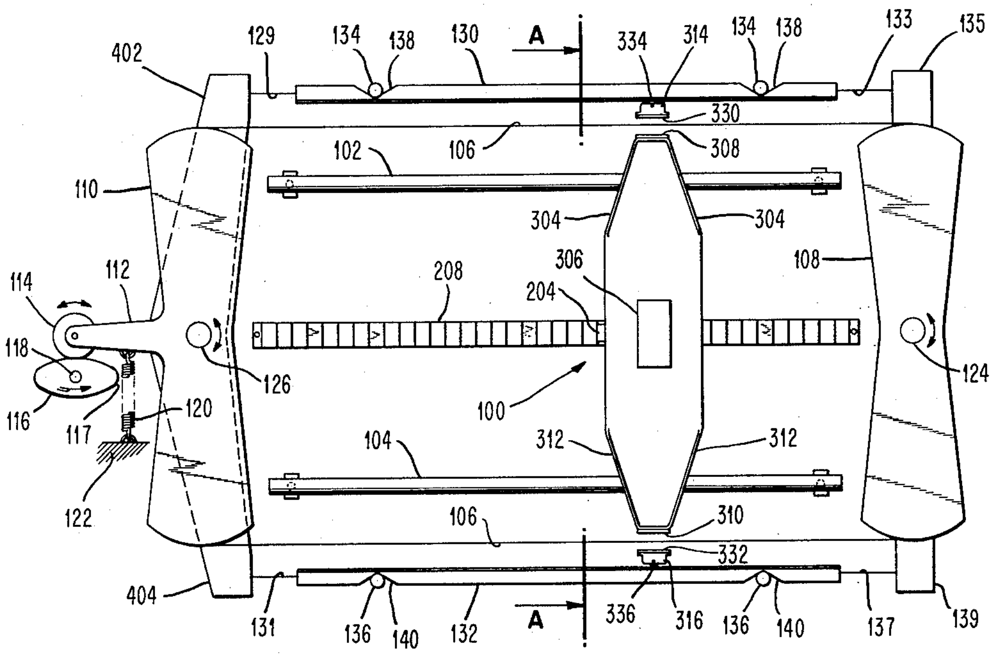
FIGURE 1 is a top view of the device constructed in accordance with the basic concept of the invention.
Figure 3:
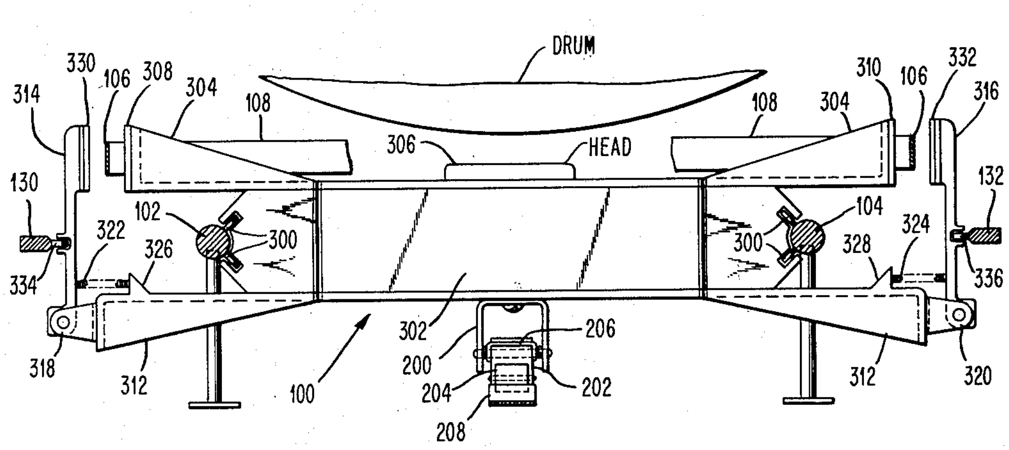
FIGURE 3 shows a front view of the carriage assembly, drive rods, and gripping means of the invention along the line A—A of FIGURE 1.

Referring to FIGURE 1, there is shown a device for positioning magnetic reading and recording heads with respect to a magnetic drum. A carriage assembly 100 is positioned so as to move in contact with guide rods 102 and 104 in a direction which is parallel with the length of the drum (not shown in this figure but mounted above the assembly 100 as shown in FIGURE 3). An oscillating drive band or shuttle 106 is physically connected to a rocker arm 108 and a further rocker arm 110. The rocker arm 110 has an extension 112 which carries a cam follower 114 at its end. This cam follower 114 is made to engage a drive cam 116 carried upon a drive shaft indicated at 118, so as to be driven in a counter-clockwise direction by an appropriate motor (not shown). The rocker arm 110 is further biased to a given position by the operation of a spring 120 which is physically connected between the extension 112 and a permanent mounting surface such as 122. The other rocker arm 108 is not driven in any manner and merely rotates about a central shaft 124.

The manner of drive of the shuttle 106 can now be set forth. As the shaft 118 causes the cam 116 to be rotated so as to bring to bear one of the lobes 117 of the cam 116 with the roller 114, extension 112 is caused to move upwardly pivoting about the central shaft 126. Thus the upper portion of the rocker arm 110 is caused to move to the right whereas the lower portion of the rocker arm 110 is caused to move to the left. This causes the oscillating drive band or shuttle 106 attached to the respective portions of the rocker arm to move in similar directions. Further, the rocker arm 108 is also caused to rotate about its central shaft 124 by the action of the rocker arm 110 so as to have its upper portion move to the right whereas its lower portion also moves to the left. As the cam 116 continues to move, it finally reaches a position where the follower 114 has been moved up as far as it may be moved by the operation of large lobe 117 of the cam 116. The cam 116 continues to rotate, holding the arms 108 and 110 in the positions described above for a period known as a first dwell time. The length of the dwell time is determined by the shape, size and speed of the cam 116. In the instant case the dwell is determined by the size of the lobes 117. Thus the shuttle is moved forward as the follower 114 moves toward a position of contact with one of the large lobes 117. It then remains unmoved as long as this large lobe continues to hold the follower 114 in its extreme extended position.

When the first large lobe 117 of the cam 116 has moved out of engagement with the follower 114, the extension 112 moves downwardly under the urging of the extended spring 120. The smaller portions of the cam 116, between the large lobes 117 are of such size as will permit the extension 112 to move downward through a sufficient path as will permit the rocker arms to return to their normal positions as shown in FIGURE 1. Thus, the upper portions of rocker arms 108 and 110 move to the left whereas the lower portions move to the right. The shuttle portions located between these rocker arms being moved in similar directions. A second dwell period is thus established during which the follower 114 contacts the smaller areas of cam 116 and thus remains in the realized position as shown in the figure.

As the cam 116 rotates and the second large lobe 117 is positioned in contact with follower 114, the cycle of operation described above is repeated. Thus for each rotation of cam 116, two cycles of shuttle operation take place.

Figure 4:
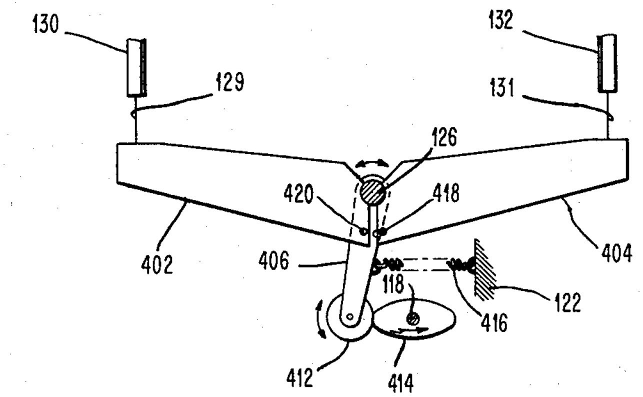
FIGURE 4 shows a detailed view of the bail actuating means.

Referring briefly to FIGURE 4, the construction and operation of the gripping device actuating bails is set forth. The gripping device actuating bails consist of three independent arms all located upon a central shaft. These arms 402, 404, and 406 are all mounted upon the shaft 126 and in a normal manner of operation are each free to rotate about this central shaft. The arm 402 is connected to a left actuating bail 130 by means of a flat spring 129 whereas the arm 404 is connected to a right actuating bail 132 by means of a further flat spring 131. The arm 406 is connected to a cam follower 412 which is made to engage a cam 414 mounted on the same drive shaft 118 that the cam 116 is mounted on. The cam 414 moves in a counterclockwise direction. The arm 406 is biased to contact elliptical cam 414 by a spring 416 connected to a permanent mounting surface such as 122. The arms 404 and 406 have a common hole 418 drilled through them, such that when the arms are in a position shown a pin could be placed through the hole 418 to cause the arms 404 and 406 to act as a single member. A further hole 420 is made common between the arm 402 and 406 so as to permit the insertion of a pin which would permit the arms 402 and 406 to operate as a single member. The arm 406 can be made to oscillate about the central shaft 126 as indicated by the double headed arrow in the following manner. As the elliptical cam 414 is made to rotate so as to bring one of the ends along its major axis into contact with the roller follower 412 the arm 406 is caused to move to the left. As the end along the minor axis is approached, the force tending to move the arm 406 to the left is removed thereby allowing the spring 416 which has been extended due to the action of the arm being moved to the left is allowed to exert its force upon the arm 406 moving it to the right, until stopped by the edge along the minor axis of the cam 414. As the second end along the major axis of the eliptical cam 414 is brought back into engagement with the following roller 412 the procedure is repeated.

In order that one of the arms 402 or 404 be actuated, it is necessary that a solenoid operated pin (not shown) be inserted into either of the holes 418 or 420 depending upon which of the arms 402 or 404 it is desired to actuate. For example, if the pin were inserted in the hole 418, upon the moving of the arm 406 to the left the arm 404 would be caused to move downwardly causing the spring 131 and bail 132 to also be moved in a downward direction. When the arm 406 is allowed to return to the right, then the arm 404 the spring 131 and the bail 132 would be caused to move in an upward direction. Similar operation of the arm 402 spring 129 and the bail 130 is possible upon the insertion of the solenoid for movement. The bail 130 is connected via flat spring 133 to a support 135, whereas bail 132 is connected via flat spring 137 to a support 139 (as shown in FIGURE 1). These additional springs and supports thus define the plane of movement of the bails 130 and 132.

Referring now to FIGURE 3, the manner of operation of the gripping means is now described. The carriage indicated generally as 100 is shown guided for movement by means of two guide rods 102 and 104. Actual contact with these guide rods is made by means of a number of rollers 300 mounted in the main body portion 302 of the assembly. An upper transverse member 304 is physically connected to the central portion 302 and carries the recording and reading heads 306 as well as friction pads 308 and 310 respectively on the left and right portions of the upper transverse member 304. A lower transverse member 312 has pivotally mounted at points 318 and 320 further members 314 and 316 at the left and right respectively. The members 314 and 316 are biased away from the central portion of the carriage 302 by operation of springs 322 and 324 operating upon extensions 326 and 328 respectively of the lower transverse member 312. In other words, the effect of the springs 322 and 324 are to urge the members 314 and 316, respectively, to positions where contact cannot be made between these members and the friction pads 308 and 310 respectively. The member 314 contains at its non-pivoted end an additional friction pad 330, whereas the member 316 contains an additional friction pad 332 at its non-pivoted end. Also, the member 314 contains a left roller 334 and the member 316 contains a right roller 336. The members 314 and 316 are so proportioned and arranged so as to permit the oscillating drive band or shuttle 106 to be positioned between the friction pads 330 and 308 on the left portion of the carriage and between the friction pads 332 and 310 on the right portion of the carriage. The rollers 334 and 336 are made to contact the bails 130 and 132 as shown in FIGURE 1. Thus, should the bails 130 and 132 be caused to move inwardly against the rollers 334 and 336, the effect would be to push the members 314 and 316 against their restraining or biasing springs 332 and 324 so as to allow engagement of the friction members 330 and 308 with the oscillating drive band or shuttle 106 on the left and to permit the engagement of the oscillating drive band or shuttle 106 by the friction pads 310 and 332 on the right. It should be understood, however, that only one or the other of these bails 130 and 132 are actuated to cause the respective closing upon the shuttles either at the right or the left portion of the carriage, at one time.

Figure 2:
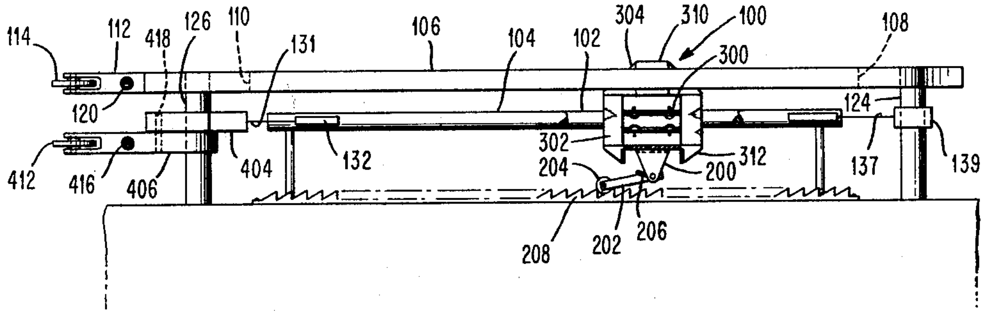
FIGURE 2 shows a side view of this same device, with some elements removed.

Referring now to FIGURE 2, the manner of construction and operation of the detent rack and roller will now be described. Attached to the lower portion of the central body 302 of the carriage assembly 100 is a support member 200, upon which is mounted on arm 202 which carries a detent roller 204. The wheel 204 and the arm 202 are urged by means of spring 206 to occupy a position in contact with the detent rack 208. This detent rack and roller permits the positive positioning of the carriage assembly 100 so as to permit a readily reproducable alignment of the reading and recording heads with a particular selected track of the magnetic drum. It should be understood that a number of heads might be positioned at the same time relative to a number of drum tracks rather than a single head relative to a single track. Also two such devices could be employed one as a vernier upon the second, i.e. one device select six tracks, a second select one of the six.

In order to permit an understanding of the manner of operation of the device as a complete unit an example will be given whereby the carriage assembly is moved in a forward direction to permit the positioning of the heads at a desired track location. Since it is desired to move the carriage assembly 100 in a forward direction, the solenoid actuated pin (not shown) is caused to be inserted in the hole 420 so as to cause the arm 402 and 406 as shown in FIGURE 4 to be jointed for movement as a single unit as set out above. This permits the movement of the bail 130 in a forward direction. The bail 130 as it attempts to move in this forward direction is prevented from so doing by the operation of the fixed guides 134 which are placed in notches 138 of the bail 130. The effect of this forward moving force on bail 130 and the restraining effect of the fixed guides 134 is to cause the bail 130 to move inwardly against the roller 334 as shown in FIGURE 3. The spring members 129 and 133 are made to flex to permit this movement. In other words axial movement has been changed to laterial movement. The roller 334 in turn transmits its force against the operation of the restraining or biasing spring 322 to cause the friction pad 330 to engage the oscillating drive band or shuttle 106 and in turn both of these elements 330 and 106 are moved against the friction pad 308. With this gripping assembly closed in this manner, it is possible for the entire carriage 100 to be moved in a forward direction when the oscillating drive band or shuttle 106 is moved as has been described hereinabove. It should be noted at this point that the amount of oscillating drive band or shuttle movement in the forward or rear direction is sufficient merely to move the carriage assembly approximately one step or one track width in either one of these directions. It is the action of the detent wheel in the detent rack that causes the movement to be limited accurately to a single track position only, so as to place a single head or group of heads relative to desired tracks. During the period in which the cam 116 holds the follower 114 and its extension 112 in the up position or in other words, during this dwell period, the cam 414 also mounted on the shaft 118 has rotated to a position along its minor axis to permit the arm 406 and 402 to return to its neutral position, thereby moving the bail 130 away. As a result of this movement of the bail 130 and the urging of springs 129 and 133, the notches 138 are again brought into contact with the fixed guides 134 thereby allowing the bail 130 to be moved in a leftward and upward direction. As a result of this movement, pressure is released from the roller 334 which permits the member 314 to move also in a left direction releasing the frictional grip between frictional pads 330 and 308 on the oscillating drive band or shuttle 106. It should also be noted that during this period when the arm 406 is restrained to its neutral position, the pin which has connected the arms 402 and 406 through the hole 420 to permit them to move as a single member is withdrawn by the solenoid. The shuttle 106 is now moved to its original position due to the urging of the spring 120 and the contact of the small portion of the cam 116 with the follower roller 114 of the extension 112. In that the gripping mechanism holding the assembly 100 to the shuttle 106 has been released, the carriage is left in the position to which it was moved.

Although, in the example above, only the leftward motion of the upper portion of the shuttle 106 was used to move the carriage assembly 100, it should be noted that both halves of the operating cycle, in other words that portion which it travels to the right may be used to advance or return the carriage assembly. For example, if it was desired to move the assembly 100 in a direction closer to the rocker arm 110, it is possible to actuate the gripping assembly controlled by the arms 316 and the bail 132 during the first portion of half cycle when the lower portion of the oscillating drive band or shuttle 106 is moving to the right. It then would be possible in the second portion of the same half cycle when the oscillating drive band or shuttle on the upper portion is moving to the left to connect the carriage by means of the gripping assembly controlled by the arm 314 and the bail 130 to advance the carriage one further position. In other words, during this one half of the cycle of operation (that is one large lobe 117 and a small portion of cam 116) the carriage assembly has been moved left two detent positions. This can be extended during the second half cycle to give a total movement of four positions.

While the invention has been described primarily with reference to the positioning of reading and recording heads with respect to a magnetic drum, it is possible to use this device in any apparatus wherein the accurate mechanical placement of one assembly with reference to another is desired; i.e., for example, with the placement of a print wheel with respect to a particular portion of a paper for example in column arrangements or other such devices.

While there have been shown and described and pointed out the fundamental novel features of the invention as applied to the preferred embodiment, it will be understood that various omissions and substitutions and changes of the form and details of the device illustrated and its operation may be made to those skilled in the art, without departing from the spirit of the invention.

The embodiments of the invention in which an exclusive property or privilege is claimed are defined as follows:

1. A positioning device for accurately moving one assembly with relation to another assembly, comprising:

(*a*) an oscillating drive means capable of moving in a forward and rearward direction alternately;

(*b*) means coupled to said oscillating drive means for moving said oscillating drive means in a forward and rearward direction alternately;

(*c*) a movable assembly comprising the object to be positioned and a selectively operable gripping means;

(*d*) actuator means coupled to said selectively operable gripping means to cause said gripping means to grip said oscillating drive means;

(*e*) and selection means coupled to said actuator means to selectively operate said actuator means to grip said oscillating drive means to cause forward or rearward movement of said movable assembly.

2. A device for accurately positioning a reading and recording instrument with respect to a recording surface comprising:

(*a*) a movable drive means capable of being moved in a forward and rearward direction;

(*b*) means coupled to said drive means to move said drive means in an oscillating motion so as to cause said means to alternately move in said forward and rearward directions;

(*c*) a movable assembly comprising a reading and recording instrument and a gripping device capable of gripping said movable drive means to permit movement of said movable assembly with said drive means in said forward and rearward directions;

(*d*) and an operating means coupled to said gripping device to selectively actuate said gripping device so as to cause movable assembly to move in said forward and rear directions.

3. A device as claimed in claim 2, wherein said movable assembly further includes a restraining device to limit the amount of movement said movable assembly may make in said forward and rearward directions.

4. A device for accurately positioning a magnetic reading and recording head with respect to a magnetic record comprising:

(a) a movable drive means capable of being moved in a forward and rearward direction;

(b) means coupled to said drive means to move said drive means in an oscillating motion so as to cause said drive means to alternately move in said forward and rearward directions;

(c) a movable assembly comprising a magnetic reading and recording head and a gripping device capable of gripping said movable drive means to permit movement of said movable assembly with said drive means in said forward and rearward directions;

(d) and an operating means coupled to said gripping device to selectively actuate said gripping device to grip said drive means and cause said movable assembly to move with said drive means in said forward and rearward directions.

5. A device as in claim 4 wherein said movable assembly further includes a restraining device to limit the amount of movement said movable assembly may make in said forward and rearward directions.

6. A device for accurately positioning a magnetic reading and recording head with respect to a magnetic record comprising:

(a) a movable drive closed loop band capable of being driven alternately in a first and second direction;

(b) means coupled to said drive band to move said drive band in an oscillating motion so as to cause said band to alternatively move in said first and second directions;

(c) a movable assembly positioned within said closed loop band and comprising a magnetic reading and recording head and gripping means placed on the opposite sides of said movable assembly, each capable of gripping a portion of said closed loop band to cause movement of said movable assembly with said closed closed loop band in said first and second directions;

(d) track means coupled to said movable assembly to support nad limit the plane of movement of said movable assembly;

(e) and an operating means coupled to said gripping means to selectively actuate said gripping means to grip said drive band and cause said movable assembly to move with said drive band in said first and second directions.

7. A device as set forth in claim 6 wherein said movable assembly further includes a restraining device to limit the amount of movement said movable assembly may make in said forward and rearward directions.

8. A device for accurately positioning a magnetic reading and recording head with respect to a magnetic record comprising: a closed loop drive means; drive means coupled to said loop drive means to cause said loop drive means to alternately move in first and second directions; track means mounted in parallel with the directions of movement of said loop drive means; a movable assembly positioned within said loop drive means and supported by said track means, said track means limiting the plane of movement of said movable assembly to cause two of the sides of said movable assembly means to move adjacent distinct portions of said loop drive means; said movable assembly comprising a magnetic reading and recording head and a plurality of gripping means, at least one such gripping means located on each of said sides adjacent said loop drive means; each of said gripping means comprising a pair of friction pads, said friction pads being placed on either side of a distinct portion of said loop drive means whereby said friction pads may each contact said loop drive means and exert pressure against the other pad of said pair; means to hold said friction pads out of contact with said loop drive means; bail means, one for each of said gripping means and coupled to said gripping means to control the opening and closing of the friction pads of said gripping means; bail drive means moving alternately in a first and second direction; and selection means to selectively couple said bail drive means to one of said bail means whereby the selected bail, when moved in a first direction, causes said friction pads of said gripping means to close grasping a distinct portion of said loop drive means moving said movable assembly in the direction of movement of said distinct portion of said loop drive means and said selected bail means when moved in said second direction causes said friction pads to open and allow said distinct portion of said loop to move relative to said movable assembly.

9. A device for accurately positioning a magnetic reading and recording head with respect to a magnetic record comprising: drive means moving alternately in a first and second direction; support means; a drive member coupled between said drive means and said support means to provide a first drive member portion and a second drive member portion, said drive member portions moving in anti-parallel directions; a movable assembly positioned between said drive member portions; said movable assembly comprising a magnetic reading and recording head and a plurality of gripping means, at least one such gripping means located on the portions of said magnetic assembly adjacent said drive member portions; each of said gripping means comprising a first and second friction pad means, one of said friction pad means being placed on each side of a drive member portion out of contact with said drive member portion; means coupled between said friction pad means to keep said first and second friction pad means from contacting said drive member portion; bail means, one for each of said gripping means, coupled to said gripping means to control the movement of said friction pad means to contact and not contact said drive member portion; bail drive means moving alternately in a first and second direction; and selection means to selectively couple said bail drive means to one of said bail means whereby the selected bail means, when moved in a first direction causes said first and second friction pads of the associated gripping means to grip said adjacent drive member portion therebetween causing said movable assembly to move with the gripped drive member portion and when said selected bail means is moved in said second direction, said bail means causes said first and second friction pads of the associated gripping means to release said adjacent drive member portion and allow said drive member portion to move relative to said movable assembly.

10. In a device for positioning a magnetic reading and recording head assembly with respect to a magnetic record, a selectively operable gripping assembly comprising: a first friction pad mounted upon said head assembly; an arm adapted to be rotated to either a first or a second position; a pivot pin rotatably mounting said arm to said head assembly; a second friction pad mounted upon said rotatable arm so that when said arm is in a first position said second friction pad contacts said first friction pad and when said arm is in a second position said second friction pad is maintained out of contact with said first friction pad; bias means coupled between said arm and said head assembly to hold said arm in said second position; bail means coupled to said arm for controlling the position of said arm; bail driving means for moving said bail means in a first and second direction alternately and selective coupling means to selectively couple said bail driving means to said bail means; whereby when said bail means moves in a first direction said arm is caused to rotate to its first position and when said bail means moves in a second direction said arm is caused to rotate to its second position.

11. In a device for positioning a magnetic reading and recording head assembly with respect to a magnetic record, a selectively operable gripping assembly comprising: a pair of first friction pad means, said pads being mounted on opposite sides of said head assembly; a pair of rotatable arms adapted to be rotated to either a first or a second position; a pair of pivot pins, one for each arm rotatably mounting said arms on opposite sides of said head assembly; a pair of second friction pad means, each of said friction pad means being so mounted upon a different one of said arms to permit said second friction pad means to contact said first friction pad means when said arms are in a first position and to prevent said second friction pad means from contacting said first friction pad means when said arms are in a second position; a pair of bias means, each coupled between said head assembly and an associated arm to hold said arms in said second position; a pair of bail means, each coupled to an associated one of said arms for controlling the position of said arm; bail drive means for moving said bail means in a first and second direction alternately and selective coupling means to selectively couple said bail driving means to said bail means.

12. A device for accurately positioning a magnetic reading and recording head assembly with respect to a magnetic record comprising: drive means moving alternately in a first and second direction; support means; a drive member coupled between said drive means and said support means to provide a first drive member portion and a second drive member portion, said drive member portions moving in anti-parallel directions; track means mounted in parallel with the directions of movement of said drive means portions; a movable assembly positioned within said drive means portions and supported by said track means to limit the plane of movement of said movable assembly; said movable assembly comprising a magnetic reading and recording head and a plurality of gripping means, each of said gripping means comprising: a first friction pad means, said pad means being mounted on one side of a drive member portion out of contact therewith; a rotatable arm mounted to permit rotation of the arm in either a first or a second position; a pivot pin rotatably mounting said arm to said head assembly adjacent a drive means portion; a second friction pad means mounted upon said arm and so located upon said arm to permit said second friction pad means to bear against said adjacent drive means portion and cause said drive means portion to contact said first friction pad means when said arm is in a first position and to prevent said second friction pad means from contacting said drive means portion and said drive means portion from contacting said first friction pad means when said arm is in a second position; a bias means, coupled between said head assembly and an associated arm to hold said arm in said second position; bail means, each coupled to an associated one of said arms and adapted for movement along their lengths, the movement of said bail means in a first direction causing said arms to rotate to said first position and the movement of said bail means in a second direction causing said arms to rotate to said second position; bail drive means coupled to said bail means for selectively controlling the movement of said bail means whereby said head assembly may be moved in a first or second direction with the movement of one of said drive means portions in accordance with the bail means selectively controlled; a detent roller coupled to said head assembly; and a detent rack mounted in parallel with the plane of movement of said head assembly whereby the detent roller engages said detent rack to limit the amount of movement of said head assembly.

References Cited in the file of this patent

UNITED STATES PATENTS

| | | |
|---|---|---|
| 195,508 | Hurley | Sept. 25, 1877 |
| 1,847,867 | Dodge | Mar. 1, 1932 |
| 2,520,131 | Deakin | Aug. 29, 1950 |
| 2,847,859 | Lyrott | Aug. 19, 1958 |
| 2,914,752 | MacDonald | Nov. 24, 1959 |
| 2,939,321 | Shonic | June 7, 1960 |

UNITED STATES PATENT OFFICE
CERTIFICATE OF CORRECTION

Patent No. 3,159,040 December 1, 1964

Walter S. Thomas, Jr., et al.

It is hereby certified that error appears in the above numbered patent requiring correction and that the said Letters Patent should read as corrected below.

Column 1, line 70, for "not longer" read -- no longer --; column 3, line 39, for "realized" read -- relaxed --; column 7, line 46, for "nad" read -- and --.

Signed and sealed this 29th day of June 1965.

(SEAL)
Attest:

ERNEST W. SWIDER
Attesting Officer

EDWARD J. BRENNER
Commissioner of Patents